ELECTRICAL TERMINAL BLOCK ASSEMBLY

Original Filed Feb. 24, 1958 3 Sheets-Sheet 1

INVENTOR
GEORGE USTIN

ATTORNEY

ELECTRICAL TERMINAL BLOCK ASSEMBLY

Original Filed Feb. 24, 1958 3 Sheets-Sheet 2

INVENTOR
GEORGE USTIN

ATTORNEY

ELECTRICAL TERMINAL BLOCK ASSEMBLY

Original Filed Feb. 24, 1958 3 Sheets-Sheet 3

INVENTOR
GEORGE USTIN

Curtis H. Langley
ATTORNEY

United States Patent Office

Re. 25,446

Reissued Sept. 17, 1963

25,446

ELECTRICAL TERMINAL BLOCK ASSEMBLY

George Ustin, Verona, N.J., assignor to Buchanan Electrical Products Corporation, Hillside, N.J., a corporation of New Jersey Original No. 2,981,923, dated Apr. 25, 1961, Ser. No. 717,065, Feb. 24, 1958. Application for reissue Apr. 20, 1962, Ser. No. 190,196

10 Claims. (Cl. 339—198)

Matter enclosed in heavy brackets [ ] appears in the original patent but forms no part of this reissue specification; matter printed in italics indicates the additions made by reissue.

This invention relates generally to electric terminal block structure and more specifically to a terminal block assembly comprising two or more sections of insulating material for accommodating as many circuits as desired, and to the sections themselves.

A previously known terminal block assembly comprises at least one body section having first and second ends having complementary configurations, a first end section having an end having the first configuration and a second end section having an end having the second configuration. In this known assembly the sections are held together by self-sustaining press fit of the complementary configurations, the end sections are apertured to accommodate screws for mounting the assembly to a panel or the like, and the tops of the end sections have slots which face each other when the sections are assembled, the slots being adapted to receive the ends of a terminal marking strip.

A terminal block assembly embodying the present invention comprises only two types of sections instead of three, there being only an end section and at least one body section. Each section is apertured to accommodate a mounting screw, and additional body sections which are interchangeable with the body section can be added to an existing terminal block assembly embodying the invention without removing any mounting screw or disassembling any existing sections.

Improved means is also provided for mounting a terminal marking strip along the top of the terminal block assembly.

Important objects of the invention are to provide terminal block structure having the above advantages.

The above and further objects and advantages will appear from the following description of an example of the invention and the accompanying drawings thereof in which.

Figure 1:
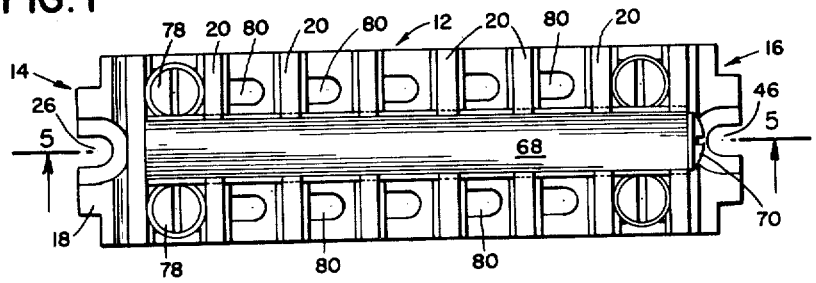
FIG. 1 is a plan view of a terminal block assembly embodying the invention with certain parts omitted for clarity.
Figure 2:
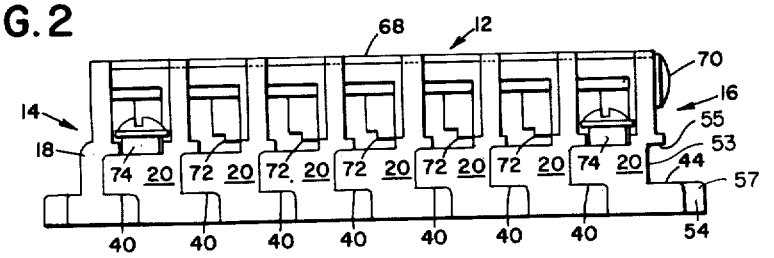
FIG. 2 is a side elevation of the terminal block assembly of FIG. 1.
Figure 3:
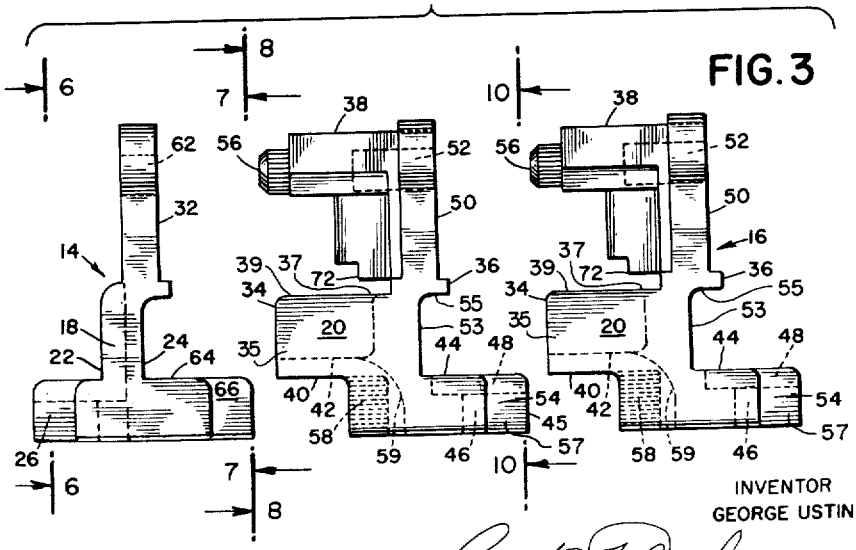
FIG. 3 is an exploded enlarged side elevation substantially of the assembly of FIGS. 1 and 2 but showing fewer sections.
Figure 4:
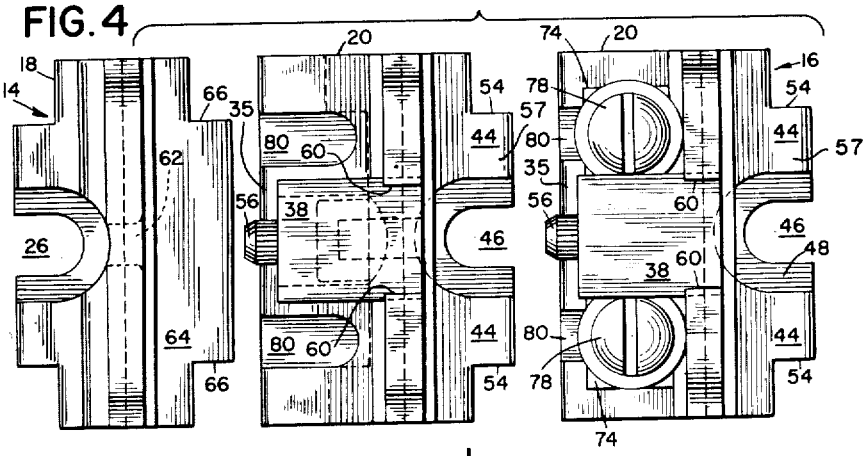
FIG. 4 is a plan view substantially of what is shown in FIG. 3.

The drawings show a terminal block assembly 12 having first and second ends 14 and 16, respectively, and comprising an end section 18 of insulating material providing end 14 and a plurality (seven as shown) of interchangeable and as shown identical additional sections 20 of insulating material, one of which, namely, the one most remote from section 18, providing end 16.

If desired, terminal block assembly 12 could include only one section 20, in addition to section 18.

Figure 5:
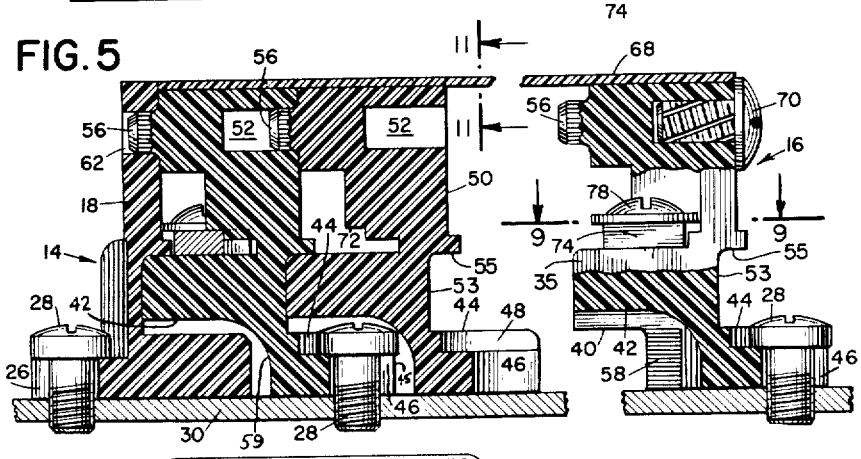
FIG. 5 is an enlarged fragmentary view on line 5—5 of FIG. 1 and also showing a panel to which the terminal block assembly is mounted.
Figure 6:
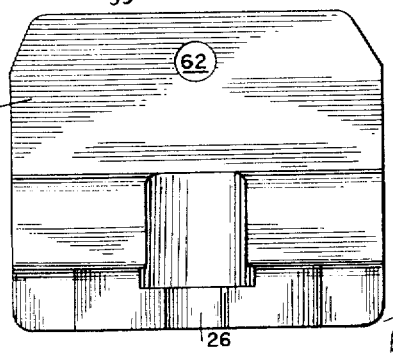
FIG. 6 is a view on line 6—6 of FIG. 3.

Section 18 has a first end 22 facing away from end 16 and a second end 24 facing away from end 14. End 22 of section 18 has an aperture 26, as best shown in FIGS. 1, 3, 4, 5 and 6, for receiving a fastening device such as a screw 28 for securing section 18 to other structure, such as a panel 30 (FIG. 5).

End 24 of section 18 has a plane surface 32 facing away from end 14.

Each section 20 has a first end 34 facing away from end 16, a second end 36 facing away from end 14 and an upper surface 38 between ends 34 and 36.

End 34 of each section 20 has *a contact-supporting projection 35 extending away from end 36 and having an upwardly facing surface portion 37 for supporting a contact and an upwardly facing surface portion 39 extending outwardly beyond surface portion 37. Projection 35 of each section 20 also has a slot opening downwardly and outwardly away from end 36 and having* a plane surface or ceiling 40 including a central recessed portion 42 in open communication with the edge of ceiling 40 remote from end 36.

End 36 of each section 20 has a plane surface or floor 44 facing in the direction opposite that faced by and substantially coplanar with ceiling 40 of the same section 20, and a plane surface or wall 45 facing away from end 34 and perpendicular to and intersecting floor 44.

End 36 of each section 20 also includes an aperture 46 for receiving a fastening device such as another screw 28 for securing that section 20 to other structure such as panel 30 (FIG. 5). One end of aperture 46 is recessed as indicated at 48, and the recessed end of each aperture 46 is in open communication with floor 44 of its section 20. Aperture 46 is also, as shown, in open communication with wall 45.

End 36 of each section 20 also has a plane surface 50 facing away from end 14 and intersecting upper surface 38 of its section 20. Each surface 50 includes a cylindrical hole 52 having an open end facing away from end 14 and near upper surface 38 of its section 20.

*Between floor 44 and surface 50, end 36 of each section 20 is provided with a transverse recess 53 having an upper wall 55 confronting floor 44 and aligned with surface portion 39.*

End 36 of each section 20 also includes a pair of oppositely facing plane surfaces 54 intersecting floor 44 and parallel to the axis of hole 52 of the same section 20 and *with floor 44* providing a projection *forming a mounting member 57.* Aperture 46 is located between surfaces 54.

End 34 of each section 20 has a cylindrical projection 56 coaxial with hole 52 of the same section 20. Projection 56 may be and as shown is provided with longitudinal serrations.

End 34 of each section 20 also includes a pair of confronting plane surfaces 58 intersecting ceiling 40 of the same section 20 and substantially coplanar with surfaces 54 of the same section 20. As shown, surfaces 58 are provided with serrations parallel to ceiling 40 of the same section 20. Recessed portion 42 is located between the planes of surfaces 58.

The edges of surfaces 58 closest to end 36 are joined by a wall 57 having a central recessed portion 59 facing away from end 36 and forming a continuation of recessed portion 42.

Each section 20 also has additional portions or projections 60 overlapping its upper surface 38 to form therewith a longitudinal dovetail groove.

End 24 of section 18 is in general similar to end 36 of each section 20, having a cylindrical hole 62 having an open end at surface 32 facing away from end 14, a floor 64 similar to floors 44 and a pair of oppositely facing parallel plane surfaces 66 similar to and spaced apart the same distance as each pair of surfaces 54. However, end 24 of section 18 has no aperture corresponding to apertures 46.

One of sections 20 is assembled with section 18 with end 34 of the former confronting end 24 of the latter. Thus, projection 56 of that section 20 is in hole 62, surfaces 66 are within surfaces 58 of that section 20, and with ceiling 40 of that section 20 overlapping and confronting and substantially coplanar with floor 64. The relative dimensions of projection 56 of that section 20 and hole 62 may be such that that projection 56 engages hole 62 in a press or interference fit, and the relative spacing of surfaces 66 from each other and of surfaces 58 of that section 20 from each other may be such that surfaces 66 engage surfaces 58 of that section 20 in a press or interference fit. If the press fits exist, they serve positively to hold section 18 and that section 20 together. In any event, whether or not the press fits exist, the interengagements of projection 56 of that section 20 and hole 62 and of surfaces 66 and surfaces 58 of that section 20 serve to locate the sections in question with respect to each other.

A terminal block assembly comprising section 18 and one section 20, that is, the two leftmost sections of FIG. 5, would be a one-circuit assembly. Each of these two sections is illustrated in FIG. 5 with a screw 28 (in the appropriate mounting aperture) securing its section to panel 30, thus to secure the one-circuit assembly to panel 30. The head of the screw 28 which secures section 20 of the one-circuit assembly to panel 30 is mainly in recessed end 48 of aperture 46, but extends therefrom, overlapping both floor 44 and, as shown, wall 45.

An additional section 20 may be added to the one-circuit assembly described above, simply by assembling the additional section 20 with the section 20 of the one-circuit assembly in the same manner in which the section 20 of the one-circuit assembly was previously assembled with section 18, that is, with projection 56 of the additional section 20 in hole 52 of the section 20 of the one-circuit assembly, with surfaces 54 of the section 20 of the one-circuit assembly within surfaces 58 of additional section 20, and with ceiling 40 of additional section 20 confronting and substantially coplanar with floor 44 of the section 20 of the one-circuit assembly and covering recessed end 48 of aperture 46.

It is noteworthy that during the assembly of additional section 20 to the previously-existing one-circuit assembly that part of the head of screw 28 of the section 20 of the one-circuit assembly which projects beyond floor 44 and wall 45 enters recessed portions 42 and 59, which thus provide a clearance space for the screw head. This fact makes it possible to add a further section 20 to an already-in-place section 20, even if the latter has assembled therewith a mounting screw 28.

Thus, too, that section 20 which is most remote from section 18 provides end 16 of terminal block assembly 12, and assembly 12 has a plane top surface provided by upper surface(s) 38 of section(s) 20.

Surface 32 of section 18 is dimensioned so as to overlap one end of the top surface of assembly 12, for a purpose which will now be brought out. Where desired, a terminal marking strip 68 can be mounted on the top surface of assembly 12. If used, strip 68 is confined lengthwise between that portion of surface 32 which overlaps the top surface of assembly 12 and the head of a screw 70 the shank of which engages hole 52 of that section 20 which provides end 16 of assembly 12. More precisely, the head of screw 70 has a surface which faces end 14 of assembly 12, and strip 68 is confined between surface 32 and this last-mentioned surface. Strip 68 is trapezoidal in transverse section and is confined against the top surface of assembly 12 by projections 60. The trapezoidal form of strip 68 conforms to the dovetail recess(es) defined by projections 60.

To install strip 68 it is merely necessary to slide strip 68 into place lengthwise from end 16 of assembly 12 and to install screw 70 in hole 52 (which would but for strip 68 be unused) of that section 20 which provides end 16. Preferably, and as shown, screw 70 is self-tapping.

If it should be desired to add a section 20 to a previously-existing terminal block assembly including strip 68, it is first necessary merely to remove screw 70.

Each section 20 also includes a projection 72 at the end 34 thereof, projection 72 being adapted to receive and hold in a press-fit self-sustaining relationship an electric contact such as that shown at 74. Projection 72 can also be used with other types of electric contacts, all in known fashion.

Figure 8:
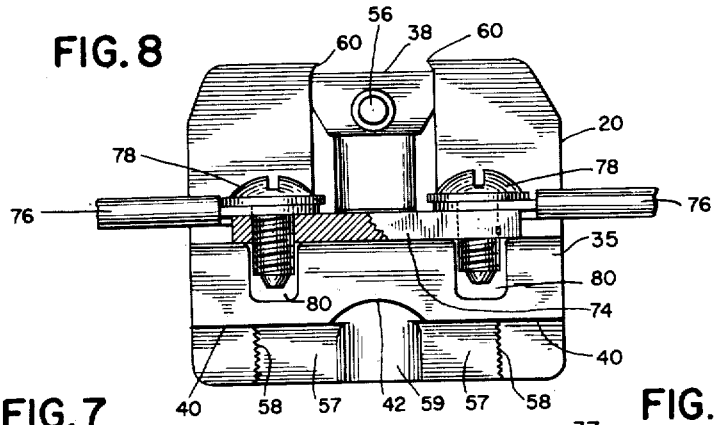
FIG. 8 is a view on line 8—8 of FIG. 3 and showing also an additional part which is not illustrated in FIG. 3.
Figure 7:
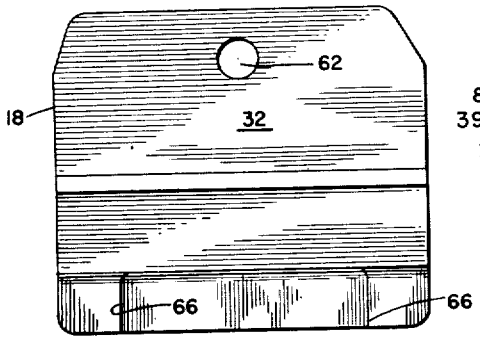
FIG. 7 is a view on line 7—7 of FIG. 3.
Figure 9:
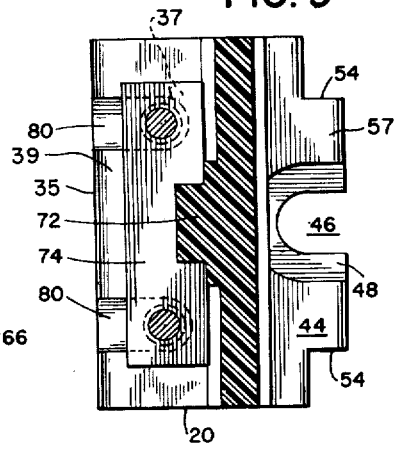
FIG. 9 is a view on line 9—9 of FIG. 5.
Figure 10:
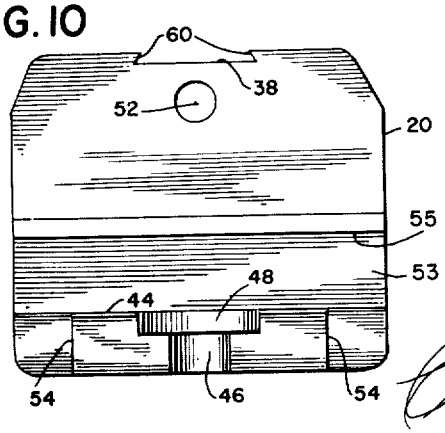
FIG. 10 is a view on line 10—10 of FIG. 3.
Figure 11:
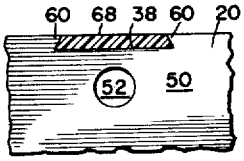
FIG. 11 is a fragmentary view on line 11—11 of FIG. 5.

Briefly, as shown, contact 74 is plate-like and has a notch (FIG. 9) which straddles and engages projection 72, and a pair of tapped holes. FIG. 8 shows contact 74 to which wires 76 are secured by screws 78 which engage the tapped holes. Provision in the form of recesses 80 is also made for accommodating the shanks of screws 78.

The invention is well adapted to the attainment of the enumerated advantages and others.

Many changes in the details of the disclosed example can be made without departing from the invention. Accordingly those details are not to be taken as limitations upon the invention except as those details may be included in the appended claims.

What is claimed is:

1. A terminal block assembly having first and second ends and comprising a first section of insulating material providing said first end, at least one additional section of insulating material including a second section providing said second end, each said section having a surface facing away from said first end and a hole in each said surface having an open end facing away from said first end, said holes aligned with each other, each said additional section having a projection facing said first end and engaging said hole of another of said sections, one of said projections engaging said hole of each of said sections except said second section, said assembly having a top surface, said surface of said first section overlapping an end of said top surface, a member having a shank in said hole of said second section and a surface facing away from said second end and overlapping the other end of said top surface, and a terminal marking strip on said top surface between said surface of said first section and said surface of said member and confined thereby.

2. A terminal block assembly having first and second ends and comprising a first section of insulating material providing said first end, at least one additional section of insulating material including a second section providing said second end, each said section having a surface facing away from said first end and a cylindrical hole in each said surface having an open end facing away from said first end, each said additional section having a cylindrical projection facing said first end and engaging said hole of another of said sections, one of said projections engaging said hole of each of said sections except said hole of said second section, said assembly having a top surface, said surface of said first section overlapping an end of said top surface, a screw having a shank in said hole of said second section and a head having a surface facing said first end and overlapping the other end of said top surface, and a terminal marking strip on said top surface between said surface of said first section and said surface of said screw and confined thereby.

3. A terminal block assembly having first and second ends and comprising a first section of insulating material providing said first end, a plurality of interchangeable additional sections of insulating material including a second section providing said second end, each said section having a surface facing away from said first end and a cylindrical hole in each said surface having an open end facing away from said first end, said holes aligned with each other, each said additional section having a cylindrical projection facing said first end and engaging said hole of another of said sections, one of said projections engaging said hole of each of said sections except said hole of said second section, each said additional section having an upper surface, said upper surfaces together providing a top surface of said block, said surface of said first section overlapping an end of said top surface, a screw having a shank in said hole of said second section and a head having a surface facing said first end and overlapping the other end of said top surface, and a terminal marking strip on said top surface between said surface of said first section and said surface of said screw and confined thereby.

4. A terminal block assembly having first and second ends and comprising a first section of insulating material providing said first end, a plurality of interchangeable additional sections of insulating material including a second section providing said second end, each said section having a surface facing away from said first end and a cylindrical hole in each said surface having an open end facing away from said first end, said holes aligned with each other, each said additional section having a cylindrical projection facing said first end and engaging said hole of another of said sections, one of said projections engaging said hole of each of said sections except said second section, each said additional section having an upper surface, a portion of each said additional section overlapping its said upper surface, said upper surfaces together providing a top surface of said block, said surface of said first section overlapping an end of said top surface, a screw having a shank in said hole of said second section and a head having a surface facing said first end and overlapping the other end of said top surface, and a terminal marking strip held against said top surface by said overlapping portions between said surface of said first section and said surface of said screw and confined thereby.

5. A terminal block assembly comprising a first section of insulating material having first and second ends, said first end having a ceiling having first and second coplanar portions and a central portion between and joining and recessed with respect to said coplanar portions and in open communication with the edge of said ceiling remote from said second end, said first end further having a wall facing away from said second end and intersecting said ceiling at the edge thereof adjacent said second end, said wall having first and second coplanar portions and a central portion between and joining and recessed with respect to said first and second coplanar portions of said wall, said second end having a floor facing in the direction opposite that faced by said ceiling, said coplanar portions of said ceiling and said floor substantially coplanar, said second end further having a wall facing away from said first end and intersecting said floor at the edge thereof remote from said first end, and said second end further having an aperture for receiving a fastening device having a head for securing said first section to other structure, said aperture having a recessed end in open communication with said wall of said second end and said floor, and a second section having first and second ends identical in shape and size to said first and second ends of said first section, respectively, said first end of said second section confronting said second end of said first section, the ceiling of said second section overlapping and confronting and covering said floor of said first section, the coplanar portions of the ceiling of said second section substantially coplanar with said floor of said first section and said wall of said second end of said first section confronting and substantially coplanar with the coplanar portions of the wall of said first end of said second section, the central portion of the ceiling of said second section and the central portion of the wall of said second section confronting the recess of said recessed end of said aperture of said first section to provide a clearance space for said head of said fastening device.

6. A first terminal block section of insulating material having first and second ends, said first end having a ceiling having first and second coplanar portions and a central portion between and joining and recessed with respect to said coplanar portions and in open communication with the edge of said ceiling remote from said second end, said first end further having a wall facing away from said second end and intersecting said ceiling at the edge thereof adjacent said second end, said wall having first and second coplanar portions and a central portion between and joining and recessed with respect to said first and second coplanar portions of said wall, said second end having a floor facing in the direction opposite that faced by said ceiling, said coplanar portions of said ceiling and said floor substantially coplanar, said second end further having a wall facing away from said first end and intersecting said floor at the edge thereof remote from said first end, and said second end further having an aperture for receiving a fastening device having a head for securing said first section to other structure, said aperture having a recessed end in open communication with said wall of said second end and said floor, said first section adapted for assembly with an additional section of insulating material having a first end identical in shape and dimensions to said first end of said first section and a second end identical in shape and dimensions to said second end of said first section, with the first end of said additional section confronting said second end of said first section, with the ceiling of said additional section overlapping and confronting and covering said floor of said first section, with the coplanar portions of the ceiling of said additional section substantially coplanar with said floor of said first section and said wall of said second end of said first section confronting and substantially coplanar with the coplanar portions of the wall of said first end of said additional section and with the central portion of the ceiling of said additional section and the central portion of the wall of said additional section confronting the recess of said recessed end of said aperture of said first section to provide a clearance space for said head of said device.

*7. A terminal block assembly comprising a plurality of separable interlocked sections of insulating material each of said sections having first and second ends, the first end of each section having a contact-supporting projection providing an upwardly facing shelf and a slot beneath said shelf opening downwardly and outwardly away from the second end, said slot having a ceiling, said slot terminating inwardly of the side edges of the section to form projections depending from the outer ends of said celing and closing the ends of said slot, the second end of each section having a mounting member extending away from the first end and having an upper surface coplanar with the ceiling of said slot and being of the same transverse width as said slot to interlock with the ceiling of the slot in the first end of an adjacent section and to form an interference fit with the depending projections at the ends of the slot in said first end of said adjacent section.*

*8. A terminal block assembly as set forth in claim 7 wherein the second end of each section is also provided with a transverse slot of which the upper surface of the mounting member at that end forms the bottom wall and the upper wall of said last mentioned slot is coplanar with the upwardly facing shelf of the projection of the first end of each section whereby said projection inter-*

*locks with the upper and lower walls of said transverse slot in the second end of an adjacent section.*

*9. A terminal block assembly comprising first and second separable, interlocked sections of insulating material, each of said sections having first and second ends, the first end of each section having a contact-supporting projection extending away from the second end of its section, said projection having an upwardly facing surface portion for supporting a contact and an upwardly facing surface portion extending outwardly beyond said contact-supporting surface portion, said projection having a slot opening downwardly and outwardly away from the second end, said slot having a ceiling terminating inwardly of the side edges of the section to form depending projections at the opposite ends of said ceiling and substantially closing the ends of said slot, the second end of each section having a projection forming a mounting member extending away from the first end and being of the same transverse width as said slot, so that said mounting member of said first section forms an interference fit with the depending projections at the opposite ends of the slot in the first end of said second section, the second end of each section being also provided with a transverse recess of which the upper wall is aligned with the upwardly facing surface portion of the projection of the first end that extends outwardly beyond the contact-supporting surface portion whereby upon insertion of the mounting member of the second end of said first section into the slot of the first end of said second section the projection of the first end of said second section interlocks with the recess of the second end of the first section and the upper wall of the transverse recess of the second end of the first section and the outwardly extending surface portion of the projection of the first end of the second section align said sections vertically.*

*10. A terminal block assembly having first and second ends and comprising a plurality of sections of only two types, including a first section of a first type having said first end, at least one second section of a second type*

*having said second end and means for supporting a terminal, said first section having a mounting projection at said first end and an interfitting projection at its other end, said second section having an interfitting and mounting projection at said second end and a recess at its other end to accommodate an interfitting projection, each said section having an integral barrier providing a surface facing away from said first end and a hole in said surface of said second section, said hole having an open end facing away from said first end, said assembly having a top surface, said surface of said first section overlapping an end of said top surface, a member having a portion in said hole of said second section and a surface facing said second end and overlapping the other end of said top surface, and a terminal marking strip on said top surface between said surface of said first section and said surface of said member and confined thereby, each said section being of insulating material.*

References Cited in the file of this patent or the original patent

UNITED STATES PATENTS

| | | |
|---|---|---|
| 1,579,400 | Samuels | Apr. 6, 1926 |
| 2,306,389 | Jorgensen | Dec. 29, 1942 |
| 2,397,102 | Graham | Mar. 26, 1946 |
| 2,743,373 | De Smidt | Apr. 24, 1956 |
| 2,848,703 | Foote et al. | Aug. 19, 1958 |
| 2,928,066 | Gordon | Mar. 8, 1960 |
| 2,981,922 | Van Valkenburg et al. | Apr. 25, 1961 |
| 3,019,408 | Ustin | Jan. 30, 1962 |

FOREIGN PATENTS

| | | |
|---|---|---|
| 583,598 | Great Britain | Dec. 20, 1946 |

OTHER REFERENCES

Schlegel (German), Application Serial No. Sch. 3550 VIII, printed July 26, 1956, K1. 21c 27.02.

Buchanan: "Electronic Design," March 1955, page 80.